June 3, 1958 — E. W. HAWKINSON — 2,836,854
TIRE RETREADING MOLD
Filed Nov. 7, 1955 — 2 Sheets-Sheet 1

INVENTOR.
Earle W. Hawkinson
BY Merchant & Merchant
ATTORNEYS

June 3, 1958 — E. W. HAWKINSON — 2,836,854
TIRE RETREADING MOLD
Filed Nov. 7, 1955 — 2 Sheets-Sheet 2

INVENTOR.
Earle W. Hawkinson
BY
Merchant & Merchant
ATTORNEYS

United States Patent Office 2,836,854
Patented June 3, 1958

2,836,854
TIRE RETREADING MOLD

Earle W. Hawkinson, Minneapolis, Minn., assignor to Paul E. Hawkinson Company, Minneapolis, Minn., a corporation of Minnesota Application November 7, 1955, Serial No. 545,295

2 Claims. (Cl. 18—44)

My invention relates to apparatus for applying new treads to worn pneumatic tire casings.

More specifically, my invention relates to improvements in the endless band type tire retreading molds and matrices, wherein the beads of the tire are spread laterally at circumferentially spaced points in order to reduce the circumference thereof to place the same in and remove same from said molds.

Still more specifically, my invention relates to endless sheet metal molds having segmental matrix members, preferably formed from cast aluminum or the like, secured to the interior peripheral surface of the sheet metal mold member.

A primary object of my invention is the provision of a device of the class generally above described, which has a distinct, precise and sharp tread pattern approaching that of a new tire in appearance.

A further object of my invention is the provision of a device of the class above described, wherein the sheet metal mold has generally radially inwardly and axially outwardly flaring tread material confining flanges adjacent its opposite marginal edges, has segmental cast matrix sections in end-to-end relationship about said cylindrical mold intermediate the said flanges, and has segmental generally rectangular cast matrix members secured to the confining flanges and extending continuously thereabout and forming radially inward extensions thereof.

A still further object of my invention is the provision of a device of the class above described wherein the tread design forming configurations on the said matrix sections and those on said matrix members cooperate to provide an endless pattern which extends over the side shoulders of the tire.

A still further object of my invention is the provision of a device of the class immediately above described, wherein the tread design forming configurations of said matrix sections define cavities which open axially outwardly in opposite directions adjacent said confining flanges, and in which said matrix members are provided with laterally projecting tongue-like matrix elements which overlie the adjacent side edges of said matrix sections and are rigidly secured to the sheet metal mold, through the matrix sections, axially inwardly from the said confining flanges.

A still further object of my invention is the provision of a device of the class immediately above described wherein the said overlying portions of said matrix elements project one each into one of said recesses in spaced relation to the walls thereof and define with the walls of said recess a generally U-shaped axially outwardly opening tread design forming rib.

A still further object of my invention is the provision of a device of the class generally above described which is relatively inexpensive to produce, which is easy to assemble, and which is attractive and durable.

The above and still further objects of my invention will become apparent from the following detailed specification, appended claims and attached drawings.

Referring to the drawings, wherein like parts are indicated by like characters throughout the several views:

Fig. 4 is an exploded view of the portion of Fig. 1, shown in section.

Figure 1:
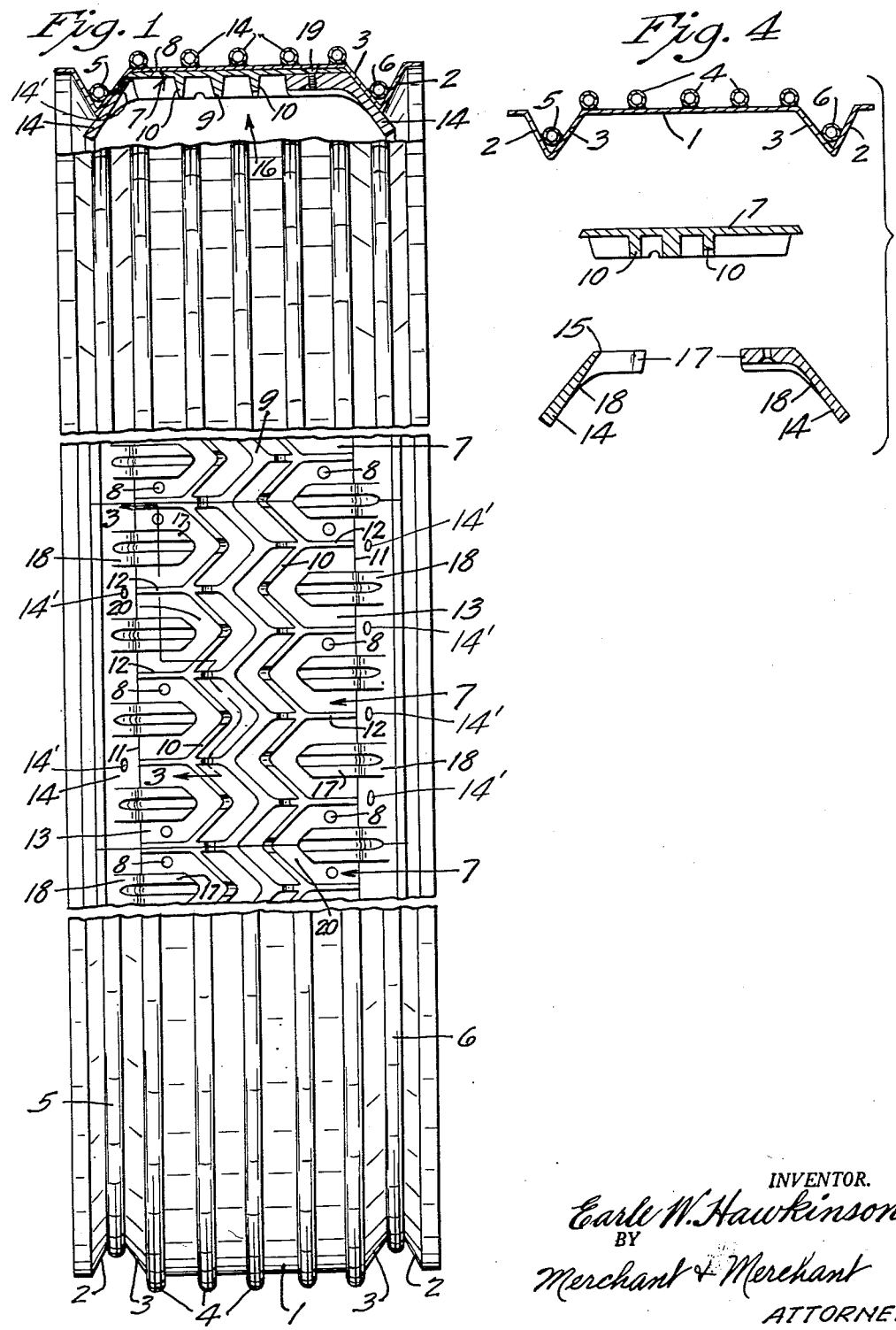
Fig. 1 is a view, partly in end elevation and partly in axial section of my novel device, some parts being broken away.
Figure 2:
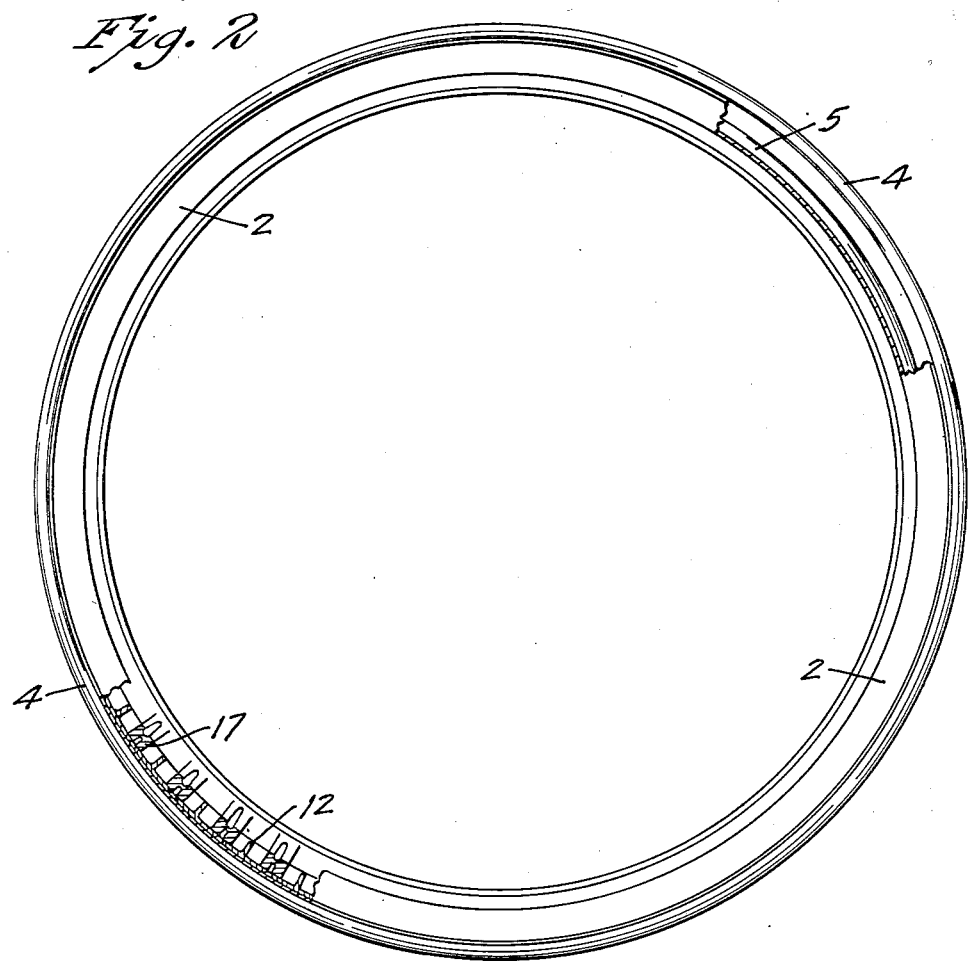
Fig. 2 is a view in side elevation of the structure of Fig. 1, on a reduced scale, some parts being broken away and some parts shown in section.
Figure 3:
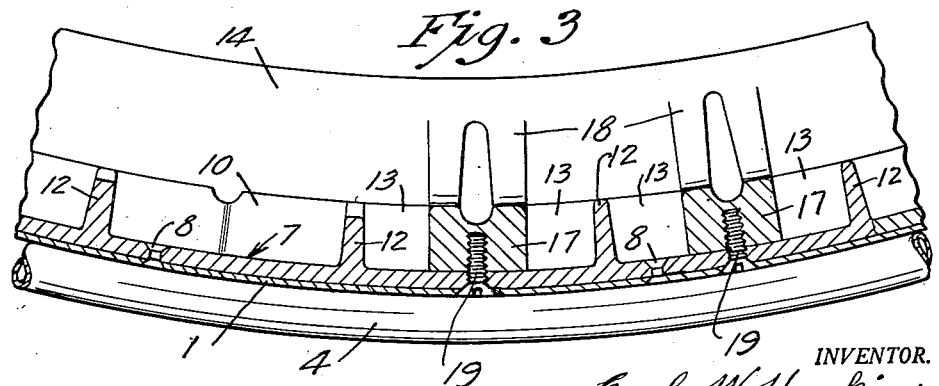
Fig. 3 is an enlarged fragmentary sectional view taken substantially on the line 3—3 of Fig. 1.

Referring with greater particularity to the drawings, the numeral 1 indicates in its entirety an endless cylindrical mold, preferably formed from sheet steel, and formed at its opposite marginal edges to provide generally radially inwardly projecting tread material confining flanges 2, the inner walls 3 of which flare axially outwardly and radially inwardly. Heat is imparted to the cylindrical mold 1 by means of an endless spirally wound steam conduit 4, the first and last convolutions of which are nestingly received within the pleated confining flanges 2, as indicated respectively at 5 and 6.

A plurality of arcuate generally rectangular matrix sections 7 in end-to-end relationship extend around the interior peripheral surface of the cylindrical mold 1 intermediate the confining flanges 2 thereof. Rivets or the like 8 retain the matrix sections 7 in tight engagement with the internal peripheral surface of the cylindrical mold 1. As shown, the matrix sections 7 are provided with radially inwardly projecting tread design forming configurations 9 including generally U-shaped serpentine ribs 10, one each adjacent opposite marginal edges 11 of matrix sections 7. As shown, the serpentine ribs 10 cooperate with transversely extended rib portions 12 to provide a plurality of side-by-side axially outwardly opening recesses 13, which terminate at the marginal edges 11.

A plurality of relatively thin segmental, generally rectangular matrix members 14 are secured by rivets or the like 14' in side-by-side relation to the outwardly flaring walls 3 of the confining flanges 2 and extend completely thereabout. Each of the matrix members 14 is provided with a longitudinal edge portion 15, which abuts the marginal edges 11 of the adjacent matrix sections 7 and in this manner defines a generally cross-sectionally U-shaped molding cavity 16. Formed integrally with each of the matrix members 14 and projecting generally radially inwardly therefrom are one or more circumferentially-spaced transversely extended tongue-like matrix elements 17 which feather off at their axially outer ends in the matrix members 14, as at 18. The axially inner ends of the tongue-like matrix elements 17 overlie the opposite marginal edge portions 11 of the matrix sections 7 and are secured by means of rivets or screws 19 to the cylindrical mold 1 in axially inwardly spaced relation to the marginal edges 11. Preferably and as shown, one each of the tongue-like matrix elements 17 is positioned with respect to an axially outwardly opening recess 13 so that it projects centrally into said recess in spaced relation to the ribs 10—12 and defines therewith an axially outwardly opening U-shaped tread design-forming rib 20.

By the above-described arrangement, not only is the tread design, formed by the design-forming ribs 10—12 and the matrix section 7, carried laterally over on to the matrix members 14—and, hence, over the shoulders and on to the upper side walls of the entire casing being retreaded, but also the mold 1, matrix sections 7, and matrix members 14 are rigidly tied together and the several elements thus greatly strengthened.

My invention has been thoroughly tested and found to be completely satisfactory for the accomplishment of the above objects, and while I have shown a preferred embodiment of my novel tire retreading mold, it should be obvious that same is capable of modification without departure from the scope of the appended claims.

What I claim is:

1. In a device of the class described, an endless annular substantially cylindrical sheet metal mold having generally radially inwardly projecting circumferentially extending tread material confining flanges adjacent the opposite marginal edges thereof, each of said flanges having inner walls flaring axially outwardly and radially inwardly from the respective marginal edge, a plurality of circumferentially arcuate generally rectangular matrix sections disposed around the interior of said mold intermediate the inner walls of the flanges with adjacent circumferential ends thereof being in abutting relationship to define a circumferentially continuous annular tread forming surface, a plurality of circumferentially arcuate segmental matrix members disposed radially inwardly and axially outwardly around the interior of each inner wall of the flanges with adjacent circumferential ends thereof being in abutting relationship to define axially spaced circumferentially continuous annular shoulder forming surfaces, the adjacent annular sides of said matrix sections and members being in abutting relationship to define a circumferentially continuous annular mold cavity of U-shape in cross-section, each of said matrix members having an axially inwardly projecting tongue-like portion which overlies the adjacent annular side portion of the respective matrix section with the radially inner edge portions thereof forming a continuous extension axially outwardly and radially inwardly of the respective inner wall of the flanges, and means securing the matrix sections and elements to the mold including means passing through the tongue-like portions and the respective matrix sections.

2. The structure defined in claim 1 wherein said matrix sections have radially inwardly projecting ribs which define a plurality of recesses which open axially outwardly in opposite directions adjacent said matrix members, the overlying inwardly projecting tongue-like portions of said matrix members being received one each within one of said recesses and defining with the ribs thereof a generally U-shaped axially outwardly opening tread design.

References Cited in the file of this patent

UNITED STATES PATENTS

| | | |
|---|---|---|
| 1,209,607 | Michelin | Dec. 19, 1916 |
| 2,662,245 | Hawkinson | Dec. 15, 1953 |
| 2,748,423 | Hawkinson | June 5, 1956 |
| 2,813,304 | Hawkinson | Nov. 19, 1957 |

FOREIGN PATENTS

| | | |
|---|---|---|
| 346,857 | Great Britain | Apr. 23, 1931 |
| 524,821 | Great Britain | Aug. 15, 1940 |